(12) United States Patent
Alsup (10) Patent No.: US 9,398,118 B2
(45) Date of Patent: Jul. 19, 2016

(54) PROCESSING APPARATUS FOR BUS DATA

(71) Applicant: INNOVASIC, INC., Albuquerque, NM (US)

(72) Inventor: Andrew David Alsup, Albuquerque, NM (US)

(73) Assignee: INNOVASK, INC., Albuquerque, NM (US)

( * ) Notice: Subject to any disclaimer, the term of this patent is extended or adjusted under 35 U.S.C. 154(b) by 0 days.

(21) Appl. No.: 14/034,837

(22) Filed: Sep. 24, 2013

(65) Prior Publication Data

US 2016/0072929 A1    Mar. 10, 2016

(51) Int. Cl.
*H04L 29/06* (2006.01)
*H04L 12/40* (2006.01)
*H04L 12/741* (2013.01)

(52) U.S. Cl.
CPC .......... *H04L 69/22* (2013.01); *H04L 12/40156* (2013.01); *H04L 45/74* (2013.01)

(58) Field of Classification Search
CPC ... H04L 47/6215; H04L 47/625; H04L 29/02; H04L 12/869; H04L 12/801; H04L 12/56; H04L 12/28; H04L 69/22; H04L 45/74; H04W 28/06
USPC ............. 370/225, 235, 395.42, 412; 709/227, 709/234, 235; 726/13
See application file for complete search history.

(56) References Cited

U.S. PATENT DOCUMENTS

| | | | |
|---|---|---|---|
| 4,484,326 A | 11/1984 | Turner | |
| 5,935,218 A | 8/1999 | Beyda et al. | |
| 6,473,424 B1 * | 10/2002 | DeJager | H04L 47/10 370/389 |
| 6,735,702 B1 * | 5/2004 | Yavatkar | G06F 21/554 713/190 |
| 8,264,957 B1 | 9/2012 | Charney et al. | |
| 2003/0079023 A1 | 4/2003 | Stefansson et al. | |
| 2009/0219942 A1 * | 9/2009 | Peeters | H04L 41/0896 370/412 |
| 2010/0235538 A1 * | 9/2010 | Charny | H04L 47/10 709/235 |
| 2011/0197273 A1 * | 8/2011 | Krumel | H04L 63/0227 726/13 |
| 2011/0228793 A1 * | 9/2011 | Bajaj | H04L 49/25 370/412 |
| 2012/0147744 A1 * | 6/2012 | Lee | H04L 47/20 370/230 |
| 2014/0003439 A1 * | 1/2014 | Assarpour | H04L 12/6418 370/394 |

FOREIGN PATENT DOCUMENTS

EP    1622305    2/2004

OTHER PUBLICATIONS

PCT International Search Report, PCT/US14/050625, Nov. 21, 2014.
PCT Written Opinion of the International Searching Authority, PCT/US 14/050625, Nov. 21, 2014.

* cited by examiner

*Primary Examiner* — Charles C Jiang
*Assistant Examiner* — Wali Butt
(74) *Attorney, Agent, or Firm* — Donald J Lenkszus (57) ABSTRACT

A communication controller apparatus couples a device comprising a device processor to a data bus. The communication controller comprises an input/output controller coupled to the bus to receive a plurality of types of data packets. The types of data packets comprise at least one type of data packets having a high priority determined by timing criticality. The input/output controller is operable to process data packets received via the bus before providing any of the received data packets to the device processor. The communication controller comprises a high priority data path comprising a high priority data packet queue a low priority data path to the device comprising a low priority data packet queue.

41 Claims, 4 Drawing Sheets

PROCESSING APPARATUS FOR BUS DATA

FIELD

The present invention pertains to the management of bus data exchanged between a device and a controller via a data packet bus, in general, and to the management of bus data in an industrial network, in particular.

BACKGROUND

Factory automation system networks have historically been connected using direct point-to-point wiring or serial fieldbuses. In both of these types of networks, control signals are the only signals present on the wire. When factory automation networks used a serial fieldbus or even a point-to-point 4-20 mA (milliampere) bus, the network had little to no influence on the operation of the field device.

Ethernet is one standardized system network that has become widespread in factory automation. One key reason for switching to an Ethernet based network is that a factory can be made more intelligent by way of additional network applications and data management.

In Ethernet networks, control signals have to coexist with other network traffic. Thus there is much more activity going on over an Ethernet network than simply passing time sensitive data to and from the end field devices.

All of this activity on the network is a "necessary evil" and can dramatically influence the response of the field device. This activity can be so overwhelming for devices that time sensitive data stops being managed by the device.

Additional network traffic is generated during network configuration. Each field device must understand the network around it, so management traffic is constantly travelling around the network updating network topology information. When a field device anywhere in the factory is replaced, this will cause an increase in network management traffic as the devices reconfigure. Web servers inherent in many field devices provide a convenient means to configure, read status and perform updates and are the source of additional network application traffic.

Network traffic on an Ethernet bus comprises industrial Ethernet traffic plus traffic from standard Ethernet sources, network management protocols, diagnostic tools, and network applications. The industrial Ethernet traffic is analogous to the traffic out on a traditional field bus system and is time sensitive traffic commanded by a programmable logic controller ("PLC") or digital control system ("DCS") and contains cyclic updates for field device data parameters.

Any component of network traffic can cause temporary heavy network load conditions or a surge. Such a surge can be caused by any number of events in the system. One common event is an address resolution protocol ("ARP") burst, or "ARP storm". An ARP storm can be caused by simply plugging a maintenance personal computer ("PC") into an otherwise stable network. In order to discover the devices on the network, such a PC will often send an identity broadcast request to the network. Every device will receive this broadcast but no device can respond until it updates its ARP table to contain the PC's Internet protocol ("IP") address. So every device will simultaneously send an ARP request broadcast to learn the PC's IP address, causing the network traffic load to surge. Surges can also be caused by faulty equipment and by Denial of Service ("DoS") attacks.

Standard Ethernet traffic is from other non-automation applications on the bus and in the end device. This can be data destined for a printer from a human machine interface ("HMI") device on the network, or quality data destined for the front office. Typically, standard Ethernet traffic is minimized on the factory floor.

Network management and diagnostic traffic is required to keep the network infrastructure working properly. Simple Network Management Protocol ("SNMP") is used to query and control elements on the network, e.g., switches, HMIs, sensors, actuators, PLCs, printers, etc. Link Layer Discovery Protocol ("LLDP") provides information about the layout of a network and can be used in re-configuring a system, as is the case when a faulty device is replaced. ARP is used by many higher-level applications to query for addressing information.

In an improperly organized network, an ARP storm can result from broadcast messages being endlessly propagated through the network, demanding a high percentage of network bandwidth. This situation can happen during commissioning or maintenance simply by inadvertently creating a loop by connecting two ports of an unmanaged switch or misconfiguring a managed switch. Every field device on the network, e.g., sensor, actuator, PLC, HMI, etc. must handle this additional traffic.

Network Applications traffic is generated by "layer 7" programs and protocols that are used as utilities by other programs. Many field devices have a web server utilizing Hypertext Transfer Protocol ("HTTP") to configure the device. Transferring files to and from a PLC or DCS typically uses File Transfer Protocol ("FTP"). Keeping time on the network typically uses Simple Network Time Protocol ("SNTP") or Institute of Electrical and Electronics Engineers standard IEEE 1588. Within industrial Ethernet protocols themselves, there is much traffic that is necessary for establishment and maintenance of the connections between PLCs and devices. These include Remote Procedure Calls ("RPC"), Discovery and Basic Configuration Protocol ("DCP"), as well as Transmission Control Protocol ("TCP"), and User Datagram Protocol ("UDP").

It is common practice to isolate field devices from non-relevant Ethernet traffic, i.e., traffic not intended for the field device, by segmenting the network with properly configured Ethernet switches. Such a practice assumes only managed switches are used to provide segmentation and switch configuration capability. It also assumes networks use a star topology in order keep traffic from other devices to a minimum. For other topologies such as a line topology or a ring topology, the switch resident on the field device should be configured to pass only messages addressed to the field device to the device's application.

In other words, a field device switch should isolate the field device application from traffic destined for other network devices, such as another field device's real-time traffic, an HMI sending data to a printer, or a PLC sending data to the front office. However, there remain three classes of network traffic that a field device switch cannot isolate from its application. These are: network management and network application traffic; broadcast and multicast traffic; and erroneous or malicious traffic.

Network management and network application traffic is traffic to and from the device other than the time-critical data required by the core application of the device. This can include such things as connection establishment and maintenance messages to/from a PLC, Simple Network Management Protocol ("SNMP") traffic for network maintenance, Link Layer Discovery Protocol ("LLDP") messages for network topology management, FTP or HTTP traffic for other features of the device, etc. For example, if another device wants to access a field device's webserver or if a PLC requests network management information, there is no way for a switch to be configured to ignore these messages.

While a properly configured switch can isolate most undesired broadcast and multicast traffic from a device, all devices must receive and analyze some broadcast messages, primarily to support ARP requests, otherwise basic communication cannot take place. Therefore, it is common to limit the maximum number of broadcast packets that are allowed in a period of time or use other techniques to handle an overload of broadcast traffic. Whichever scheme is used, the field device still needs to process a reasonable percentage of this traffic in order to maintain basic communications.

Erroneous or malicious traffic is traffic directed to the field device, but for which there is no supported function or service in the device. For example, another element on the network can attempt to open a connection to a socket that is not supported by the device. The field device must still service this request, taking time away from the device's real-time communication. When this type of action happens repeatedly in an attempt to hack or crash the device, it can be considered malicious.

Since a switch cannot isolate a field device's application from the above classes of traffic, the problem is compounded when such traffic spikes to unexpected levels. It is not unusual for many devices on a network to send particular types of maintenance traffic at roughly the same time, for example. This simultaneous transmission results in a large number of packets to be managed in a relatively short time. In other cases, a network with a mix of field devices with different network management capabilities, i.e., Class A and Class B devices in the same PROFINET network, can result in packets going where they don't belong. On a PROFINET network, LLDP packets may be propagated from multiple devices causing a large spike in traffic for a network with many field devices.

In short, there is a lot more going on over an Ethernet network than on a serial fieldbus network. Segmentation and switches can only help so much, especially as factory networks evolve. Standard techniques for controlling traffic at the Ethernet switch level do not solve the problem of guaranteeing the real-time traffic and processing in the midst of this sort of traffic. This leaves field devices vulnerable to eventual performance problems or even failure over time as network traffic increases.

Despite the variability of network traffic, modern control systems are expected to continue to operate flawlessly Accordingly, it is desirable to provide a method and an arrangement for field devices that inherently protect them from having to respond to all of these types of traffic.

SUMMARY

In accordance with the principles of the invention time sensitive application data packets are prioritized at a field device with a communication interface such that precious processing cycles are not spent on non-critical network messages.

In accordance with one embodiment, a method is provided for operating a communication controller coupling a device comprising a processor with a bus, the method comprises: receiving a plurality of types of data packets via the bus. The types of data packets comprise at least one type of data packets having a high priority determined by timing criticality, and at least one other type of data packets having lower priority. The method further comprises processing received data packets before making available said received data packets to the device processor. The processing of received data packets comprises: evaluating each received data packet in accordance with predetermined criteria; rejecting any of the received data packets that fails to meet the predetermined criteria; identifying non-rejected data packets having high priority; identifying said non-rejected other data packets having lower priority; providing a high priority data path or communication channel to the processor for the high priority data packets; providing at least one additional data path or communication channel to the processor for the other data packets; providing the high priority data packets to the processor at the high priority data path; providing the other data packets to the processor at one of the at least one additional data path; providing a high priority alert to the device processor to the presence of high priority data packets at the high priority channel; and providing another alert to the device processor to indicate the presence of the other data packets at the one additional communication channel.

In the embodiment, the device processor comprises executable software which is arranged to minimize latency in processing the high priority data packets regardless of processing the other data packets.

The method of the embodiment further comprises alerting the device processor in accordance with predetermined criteria when received data packets discarded due to processing delays in the device processor. The predetermined criteria are determined by the communication protocol utilized on the bus and device configuration.

The method of the embodiment may further comprise selecting the predetermined criteria from timeliness, protocol specific fields, data source, destination addressing, and protocol dependent parameters.

In one embodiment, the bus comprises an Ethernet bus.

In accordance with one embodiment, the method comprises processing the data packets such that there is no delay or interruption in processing the high priority data packets resulting by receipt of the other data packets.

The one embodiment further comprises processing the data packets such that alerts associated with the other data packets will not interrupt processing of the high priority data packets.

The embodiment further comprises: providing a high priority output data path coupled to the device processor for high priority output data packets; providing at least one additional output communication channel coupled to the processor for other output data packets; receiving high priority output data packets from the processor at the high priority communication channel; receiving other output data packets from the processor at one of the at least one additional output communication channel; and interrupting transfer of the other output data packets whenever the high priority output data packets become available.

The embodiment may further comprise: managing data packet traffic overload conditions by receiving feedback indications from the device processor indicative of processing status of the device processor; and restricting data packet traffic by type based on the feedback indications.

An embodiment may comprise: managing data packet traffic overload conditions by monitoring at least one of data packet traffic and data packet types; and restricting data packet traffic or data packet types when the monitoring indicates that the data packet traffic or the data packet types exceed a predetermined level.

An embodiment may comprise monitoring data packet traffic on at least one of the high priority data path and each additional data path.

The embodiment may comprise determining if data packet traffic monitored on at least one channel of the high priority data path and each additional data path exceeds a predetermined level.

The embodiment may comprise restricting data packet traffic on a data path when the data packet traffic exceeds the predetermined level.

The embodiment may comprise determining if data packet traffic message types monitored on at least one of the high priority data path and each additional data path exceeds a predetermined level.

The embodiment may comprise managing data packet traffic overload conditions by monitoring at least one of data packet traffic and data packet types, and restricting the monitored data packet traffic or data packet types when the monitoring indicates that the data packet traffic or the data packet types exceed a predetermined level.

In yet another embodiment the method may comprise managing data packet traffic overload conditions by receiving feedback indications from the device processor indicative of data packet processing status of the device processor; and restricting data packet traffic by type based on the feedback indications.

The embodiment may comprise providing a network watchdog responsive to the device processor to restrict or not restrict data packets.

The embodiment may further comprise operating the network watchdog such that the communication interface restricts incoming data packets for one or more preselected data paths in response to the processor feedback indications.

In various embodiments, the at least one additional communication channel is one of a plurality of additional communication channels for the other data packets.

The various embodiments may further comprise: managing device processor overload conditions for predetermined data paths; receiving indications from the device processor indicative of processing status of packet data received for the predetermined data paths; and selectively restricting data packet traffic for the predetermined data paths based on said indications.

The various embodiments may comprise providing a network watchdog apparatus responsive to the indications to control acceptance of received data packets by the communication controller; operating the network watchdog such that the communication controller drops incoming data packets for the predetermined data paths when the device processor provides corresponding indications.

In further embodiments, the method comprises providing the network watchdog apparatus with a mask register that the processor utilizes to indicate which data paths are subject to overload management.

In the further embodiments, the method may comprise providing the network watchdog apparatus with a timer having a programmable delay, operating the timer such that when the timer is in a first predetermined state, data packets are forwarded to the additional data paths subject to overload management, and operating the timer such that when the timer is in a second predetermined state, data packets are restricted for the additional data paths subject to overload management.

The method may comprise: controlling operation of the timer with triggers received from the device processor. The device processor provides the triggers on a regular basis when the device processor is able to timely process data packets, and the device processor does not provide the triggers on a regular basis when the device processor reaches a data packet processing overload condition.

In other various embodiments, the method comprises managing other data packets that are broadcast data packets by limiting broadcast data packet traffic to the device processor.

In other various embodiments, the method comprises managing other data packets that are broadcast data packets by evaluating each broadcast data packet to determine if it is of a predetermined type and is addressed to the device before forwarding the broadcast data packet to device processor.

In other various embodiments, the method comprises managing the other data packets that are broadcast data packets by determining that a broadcast data packet is of a predetermined type and is addressed to the device, generating a response and not forwarding the broadcast data packet to the device.

In other various embodiments, the method comprises managing the other data packets by limiting data packet traffic to the device processor.

In other various embodiments, the method comprises managing the other data packets by evaluating each data packet to determine if it is of a predetermined type and is addressed to the device before forwarding said data packet to the device.

In other various embodiments, the method comprises managing the other data packets by determining that a data packet is of a predetermined type and is addressed to the device, generating a response and not forwarding the data packet to the device.

An embodiment of a communication controller apparatus coupling a device comprising a device processor to a data bus that is coupled to a controller is provided. The communication controller comprises an input/output controller coupled to the bus to receive a plurality of types of data packets. The types of data packets comprise at least one type of data packets having a high priority determined by timing criticality. The input/output controller is operable to process data packets received via the bus before providing any of the received data packets to the device processor. The input/output controller is further operable to evaluate each received data packet in accordance with predetermined criteria and to reject any received data packet that fails to meet the predetermined criteria. The input/output controller is operable to identify non-rejected ones of the received data packets as high priority data packets and low priority data packets. The communication controller comprises a high priority data path to the device for high priority data packets. The high priority data path comprises a high priority data packet queue. The input/output controller comprises a low priority data path to the device for low priority data packets. The low priority data path comprises a low priority data packet queue. A high priority interrupt handler provides alerts to the device processor when high priority data is available for the device, and a low priority interrupt handler provides alerts to the device when low priority data is available for the device.

The device processor software may be arranged to minimize latency in processing the high priority data packets regardless of processing low priority data packets.

The communication controller apparatus may be operable to generate an alert to the device when received data packets are rejected.

The predetermined criteria in various embodiments are determined by the communication protocol utilized on the data bus. The predetermined criteria may be selected from timeliness, protocol specific fields, data source, destination addressing, and protocol dependent parameters.

In various embodiments, the bus comprises an Ethernet bus.

The device processor apparatus is operable to process high priority received data packets and low priority received data packets such that processing high priority data packets is not interrupted for received low priority data packets.

The device processor apparatus processes data packets such that alerts associated with low priority data packets will not interrupt processing of high priority data packets.

Communication controller apparatus in the embodiment may further comprise a high priority output data path from the device to the input/output controller for high priority output data packets, and a low priority output data path from the device to the input/output controller for low priority output data packets. The communication controller may interrupt transfer of low priority output data packets to the input/output controller whenever a high priority output data packet become available from the device processor.

The communication controller may be operable to manage data packet traffic overload conditions by restricting data packet traffic by type in response to receiving an indication from the device processor indicative of a processing status of the device.

The communication controller may be operable to manage data packet traffic overload conditions by restricting data packet traffic or data packet types when said data packet traffic or said data packet types exceed a predetermined level.

The communication controller in one embodiment comprises monitor apparatus to monitor data packet traffic on at least one of the high priority data path and the low priority data path. The monitor apparatus determines if data packet traffic monitored on at least one of the high priority data path and each low priority data path exceeds a predetermined level.

In one embodiment, the monitor apparatus restricts data packet traffic on the low priority data path when the data packet traffic on the low priority data path exceeds the predetermined level.

In one embodiment, the monitor apparatus monitors data packet traffic message types on at least one of the high priority data path and the low priority data path. The monitor apparatus may determine if data packet traffic message types monitored on at least one of the high priority data path and the low priority data path exceeds a predetermined level. The monitor apparatus may restrict data packet traffic message types on one of the high priority data path and the low priority data path when the data packet traffic types exceed the predetermined level.

In one embodiment, the monitor apparatus comprises data packet traffic management apparatus to monitor at least one of data packet traffic and data packet types, and to restrict said data packet traffic or data packet traffic of the data packet types when the data packet traffic or the data packet traffic of the data packet types exceed a predetermined level.

In one embodiment, the data packet traffic management apparatus restricts the monitored data packet traffic when the monitored data packet traffic exceeds the predetermined level.

In another embodiment, the data packet traffic management apparatus restricts data packet traffic message types when the data packet traffic exceeds the predetermined level.

The data packet traffic management apparatus may be coupled to the device processor to receive indications from the device processor indicative of processing status of the device processor and to restrict data packet traffic by type based on the indications.

The communication controller apparatus in certain embodiments comprises network watchdog apparatus responsive to the device processor to control the input/output apparatus to restrict or not restrict processing of data packets. The network watchdog apparatus operates to restrict incoming data packets for one or more preselected data paths in response to the device processor.

In various embodiments, the communication controller comprises a plurality of lower priority data paths each having a priority lower than the high priority data path. The network watchdog apparatus operates to manage processor overload conditions for predetermined one data paths of the lower priority data paths.

The network watchdog apparatus receives indications from the device processor indicative of processing status of packet data received for the predetermined one data paths and is operable to cause the input/output apparatus to selectively restrict data packet traffic for the predetermined one data paths.

The network watchdog apparatus is operable to selectively control acceptance of received data packets by the input/output apparatus.

In various embodiments the network watchdog is operable to cause the input/output apparatus to drop predetermined ones of incoming data.

In one embodiment the network watchdog apparatus comprises a mask register. The mask register is responsive to the device processor to indicate which data paths of said plurality of lower priority data paths are subject to overload management. The network watchdog apparatus may comprise a timer having a predetermined delay. The timer is in a first state or a second state. When the timer is in the first state, data packets are forwarded from the input/output apparatus to the plurality of lower priority data paths subject to overload management. When the timer is in the second state, the data packets are restricted for the plurality of lower priority data paths subject to overload management.

The timer is controlled by signals from the device processor. The device processor provides the reset signals to the timer on a regular basis when the device processor is able to timely process data packets; and the device processor does not provide reset signals when the device processor reaches a data packet processing overload condition.

In various embodiments, the input/output controller operates to limit providing to the device the lower priority data packets that are broadcast data packets. The input/output controller manages lower priority data packets that are broadcast data packets by: evaluating each broadcast data packet to determine if it is of a predetermined type and is addressed to the device before forwarding the broadcast data packet to the device.

In various embodiments, the input/output controller is operable to manage lower priority data packets that are broadcast data packets by: determining that a broadcast data packet is of a predetermined type and is addressed to the device, generating a response and not forwarding the broadcast data packet to the device.

In various embodiments, the input/output controller is operable to limit low priority data packet traffic presented to the device.

In other embodiments, the input/output controller is operable to evaluate each data packet to determine if it is of a predetermined type and is addressed to the device before forwarding the data packet to the device.

In yet other embodiments, the input/output controller is operable to determine if a data packet received over the bus is of a predetermined type and is addressed to the device, automatically generating a response and not forwarding the data packet of the predetermined type to the device.

BRIEF DESCRIPTION OF THE DRAWING

The invention is described in conjunction with the drawing figures in which like reference designators are used to identify like elements, and in which.

DETAILED DESCRIPTION

Industrial Ethernet networks utilize a combination of star, line, redundant star, and ring topologies to connect field devices to controllers. In the representative Ethernet network 100 of FIG. 1, a line topology is used rather than a ring or star topology. Network 100 comprises a PLC 101, a plurality of field devices 103 and Ethernet bus 105.

Figure 1:
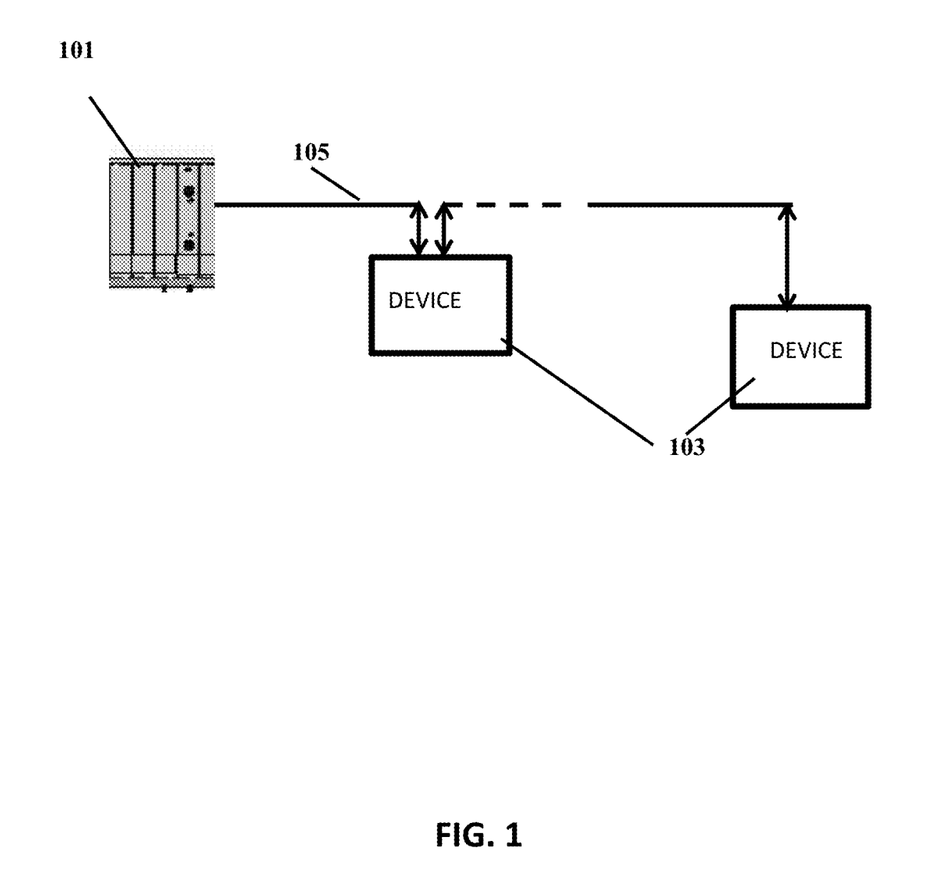
FIG. 1 illustrates a system in accordance with the principles of the invention.

A field device 103 at the Beginning-Of-Line (BOL) in a line topology provides load conditions similar to a ring topology without the redundancy protocol of a ring topology. Placing a field device 103 at the End-Of-Line (EOL) provides similar load conditions to a star topology. A device 103 at the Beginning-Of-Line sees not only its own traffic, but also all of the traffic with devices 103 further down bus 105. A device at the end-of-line does not see any of the upstream traffic, except broadcast messages, so the network load it sees is less than if it were at the Beginning-of-Line.

The present invention pertains to the processing and management data packets over a bus at a device such as field device 103 comprising a processor 101 or central processing unit CPU.

The processing and management involves various types of data with varying degrees of criticality in terms of timing.

Although the embodiment described herein utilizes an Ethernet bus 105, the principles of the invention apply to other types of bus arrangements, such as, for example an RS-485 bus, a wireless bus, or a custom backplane bus. Bus 105 may comprise a direct connection between a controller 101 and a device 103. Bus 105 may be a single bus in communication with multiple devices 103. There may be multiple sets of controllers 101 and devices 103 on bus 105. Bus 105 may carry many different kinds of traffic.

Figure 2:
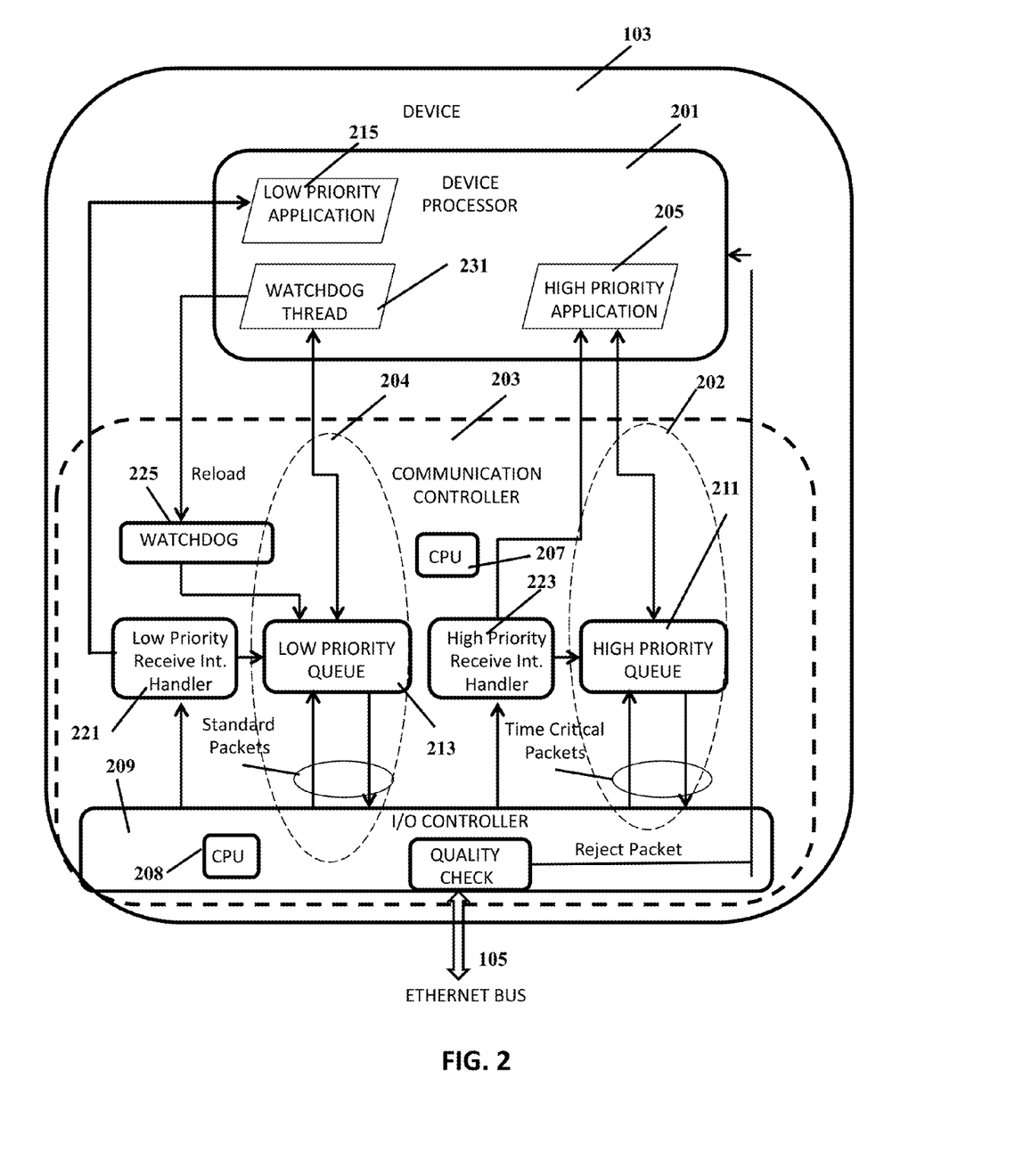
FIG. 2 is a block diagram of a field device.

FIG. 2 illustrates an embodiment of the invention in which a field device 103 comprises a device processor 201 and a communication controller 203. It will be appreciated by those skilled in the art that field device 103 may comprise additional circuitry, apparatus, functionality and interfaces to external equipment that are not shown for purposes of clarity.

Communication controller 203 comprises a central processing unit "CPU" 207 that comprises a plurality of contexts, or "threads". These are the same type of contexts that would be implemented as threads in a real-time operating system (RTOS) kernel. All of the scheduling, priorities and memory protection found in an RTOS are implemented in CPU 207. Providing separate contexts or threads allows separation of communication tasks. Real-time message processing is assigned to one context or thread, while non-real-time message processing can be assigned to another context or thread. These separate contexts are assigned different priorities so lower priority, non-real time contexts, do not interrupt a higher priority, real-time context. Communication controller 203 comprises programmable unit(s) such as CPU 208 and CPU 207 that supply a plurality of threads of operation corresponding with the various data-flows, e.g., transmit/receive over the bus connections to Ethernet bus 105, and send/receive to device processor 201. These threads provide deterministic and timely processing of packets as they flow through communication controller 203.

Communication controller 203 may be a separate unit that is coupled to a field device 103, or it may be integrated into field device 103. Communication controller 203 may be implemented as one or more integrated circuits. Advantageously, the functionality of communication controller may be provided in hardware structure or in a combination of hardware structure and program code that is provided as firmware.

Communication controller 203 is coupled to Ethernet bus 105 at one or more ports. Although only one port is shown in FIG. 2, it will be appreciated by those skilled in the art that other embodiments may have two or more bus ports coupled to an Ethernet bus or other type of bus. In addition, communication controller 203 comprises a processor CPU 208 to control its operation. In other embodiments having two or more ports, there may be a processor CPU 208 associated with each bus port. Each processor CPU 208 controls data flow over two threads to its associated bus port, in input thread and an output thread. In yet further embodiments, the functionality of processor CPU 208 may be implemented in programmable hardware. One attribute of Ethernet is that it is possible to distinguish different message types. Communication controller 203 advantageously utilizes this attribute to identify time sensitive messages and time critical data and separate the time sensitive messages and time critical data from standard network data received over Ethernet bus 105. By identifying and separating time critical messages and time critical data, communication controller 203 is able to process the time critical messages and time critical data differently from standard network data.

Communication controller 203 identifies and separately processes the time sensitive messages and time critical data from standard or non-critical network data. Communication controller 203 provides one separate processing path 202 or the equivalent of a separate "channel" for the time sensitive messages and time critical data from Ethernet bus 105 to device processor 201 and another separate processing path 204 or channel for standard network data.

Communication controller 203 automatically assigns a higher priority to time sensitive messages and time critical data and a lower priority to standard network data. The higher priority is utilized to allow time sensitive messages and time critical data to pass directly to field device high priority application 205 uninterrupted. As used at various places herein, data packets comprising "time sensitive messages and time critical data" are referred to as "high priority data" and data packets comprising "standard network data" are referred to as "low priority" data In contrast with the embodiment of the invention shown in FIG. 2, in prior art architectures, in most cases, a single data channel is provided from the communication controller and the device processor, requiring low priority packets to be transferred to completion and evaluated (to determine priority) before a high priority packet can be transferred. In other cases, where there are multiple data channels, the packets are distributed among these channels according to a network (bus) priority scheme which may have little to do with the relative priority of packet processing on the device processor. This means that processing of an ARP message, for example, will be carried through to completion even if it is time for a field device application to transmit its data to PLC 101. If PLC 101 requires this data at a 2 millisecond (ms) rate, for example, it may arrive at 2 ms one time and 3 ms another time. In such prior architectures the low priority ARP message blocks processing of high priority real-time message even though that is not what is best for the system.

Communication controller 203 comprises a universal input/output I/O controller 209. Universal I/O controller 209, in the embodiment shown comprises processor CPU 208. Universal I/O controller 209 is universal in that, among other things, it is programmable, utilizing firmware, to accommodate various protocols utilized on bus 105. I/O controller 209 processes packets received and transmitted over Ethernet bus 105. I/O controller 209 is programmed specifically for the bus protocol being used. It will be apparent to those skilled in the art that for specific protocols, I/O controller 209 may be implemented entirely in hardware integrated into a communication controller device.

I/O controller 209 distinguishes high priority data packets from low priority data packets.

In addition I/O controller 209 is operable to evaluate the quality of received data packets. In evaluating the quality of data packets, I/O controller is programmed to evaluate the following aspects of each data packet: timeliness, protocol-specific fields (serial counters, checksums, etc.), data source, destination addressing, and various other parameters depending on the protocol.

Upon evaluation, each data packet that fails the quality check is automatically rejected and an alert is provided to device processor 201 as appropriate. Each data packet that passes the quality check is made available to device processor 201 via either a high priority data path 202 or communication channel or via a low priority data path 204 or channel appropriate to its priority.

High priority data path 202 comprises a high priority data packet queue 211 and low priority data path 204 comprises a low priority queue 213. In other embodiments, low priority queue may comprise a plurality of queues for a corresponding plurality of data paths having priorities lower than that of the high priority data path 202.

When data is made available to device processor 201 at either low priority queue 213 or high priority queue 211, an alert is provided to device processor 201 that data is present. The alert is priority specific according to the priority of the data and is provided by low priority receive interrupt handler 221 and high priority receive interrupt handler 223. Although the low priority receive interrupt handler 221 and high priority receive interrupt handler 223 are shown in communication controller 203, in other embodiments, low priority receive interrupt handler 221 and high priority receive interrupt handler 223 may be provided in device processor 201.

By providing separate data paths 202, 204 for high priority data and low priority data, it is possible to organize software on device processor CPU 207 to minimize latency in handling the high-priority data processing, regardless of the load of low priority data/processing.

Distinguishing high priority data can range from simple, e.g., VLAN priority field, to complex, e.g., PROFINET Ether type+source address+PROFINET type field in particular range or equal to value set at connection time. The distinction may be based on widely recognized protocols or vendor specific and even application specific parameters. This allows device processor 201 software to be segmented into separate functions that deal strictly with either high priority or low priority data/processing such as high priority software application 205 and low priority software application 215, rather than making that distinction in software.

Evaluating the quality of data packets and rejecting low quality data packets by I/O controller 209 serves to offload the high priority processing function from device processor 201, further simplifying the processing by high priority application 205 such that it doesn't need to identify and process bad data, thereby reducing the overall quantity of data processed.

Providing separate hardware data paths or channels and separate distinct hardware generated high and low priority interrupts further allows separation of software functionality in device processor 201 for high priority data and low priority data. By providing this structure there is no delay or interruption of high-priority processing to handle the arrival of low priority data. The interrupt associated with low priority data is of lower operational priority than the processing of high priority data, i.e., the low priority interrupt will not interrupt high priority data processing).

A separate high priority queue 211 and a low priority hardware queue 213 are provided so that the high priority data can be sent or received even if there is a lot of low priority data already queued. ARP, FTP, HTTP, SNMP, LLDP and other low priority messages discussed above are identified by I/O controller 209 and are sent to non-real-time message processing context low priority application 215 via low priority data path 204 comprising low priority queue 213, while the messages containing real-time data are sent up to real-time message processing context or application 205 via high priority data path 202 comprising high priority queue 211.

In an overload situation, where device processor 201 doesn't have the bandwidth to process all data packets that are received and requested via Ethernet bus 105, communication controller 203 processing still takes place on time and completely. Processing of lower priority data packets is managed by communication controller 203 to provide the best practical response. Low priority data packets are triaged and processed on a best-effort basis. Under overload conditions, low priority data packets may be dropped. In contrast, high priority data packets are not dropped because they are processed by dedicated resources.

For example with PROFINET, I/O controller 209 selects as high-priority data only those data packets with the PROFINET Ether type, the frame type for the current connection, and those sent from PLC 101 for the current connection. Other protocols are managed similarly. I/O controller 209 identifies Ethernet messages quickly and routes them directly to the appropriate context, i.e., high priority application 205 for processing.

Communication controller 203 additionally provides transmit separation for outgoing data from device processor 201 to bus 105. Separate data paths 202, 204 or channels are provided for high priority data to be transmitted over bus 105 and for low priority data to be transmitted over bus 105. High priority data path 202 comprises high priority queue 211 and low priority data path 204 comprises low priority queue 213.

Communication controller 203 interrupts transfer of low priority data to I/O controller 209 for the transfer of high-priority data whenever high priority data becomes available from device processor 201.

Although the embodiment of FIG. 2 illustrates a communication controller having a high priority data path 202 and a low priority data path 204 other embodiments can provide additional data paths. Providing additional data paths allows for separate processing of different types of incoming and outgoing data packets and simplifies the software handlers for the various types.

By way of example, a two data path implementation of communication controller 203 for PROFINET would utilize the high priority data path or channel for process data and would utilize the low priority data path or channel for all other types of data. This includes messages that will be processed by very different pieces of software associated with device processor 201.

In a further embodiment for PROFINET, more communication controller 203 data paths or channels can be provided.

Separate data paths may be provided for: timed process data (class C packets); untimed process data (class B packets); synchronization packet; device and network management packets; IP packets; ARP/ICMP packets; and other data packets. In addition, additional priority interrupt handlers may be provided for each of the additional data paths. Providing additional data paths allows for the further simplification of each portion of software associated with device processor 201.

Communication Controller 203 utilizes data discrimination and prioritization to manage traffic overload conditions. I/O controller 209 monitors traffic bandwidth on each data path or even on particular message types within a data path. When bandwidth exceeds a pre-determined level, that particular type of traffic can be restricted, allowing timely processing of data packets on all other data paths or channels.

Communication controller 203 may be structured to provide limiting of traffic by type. In one arrangement, as overall bandwidth exceeds a predetermined level, communication controller 203 restricts data packets for particular channels or restricts particular packet types. In another arrangement, as bandwidth on a particular channel or packet type exceeds a predetermined level, communication controller restricts packet data of that type. These various arrangements for limiting traffic utilize feedback from device processor 201 indicating processing status.

Figure 3:
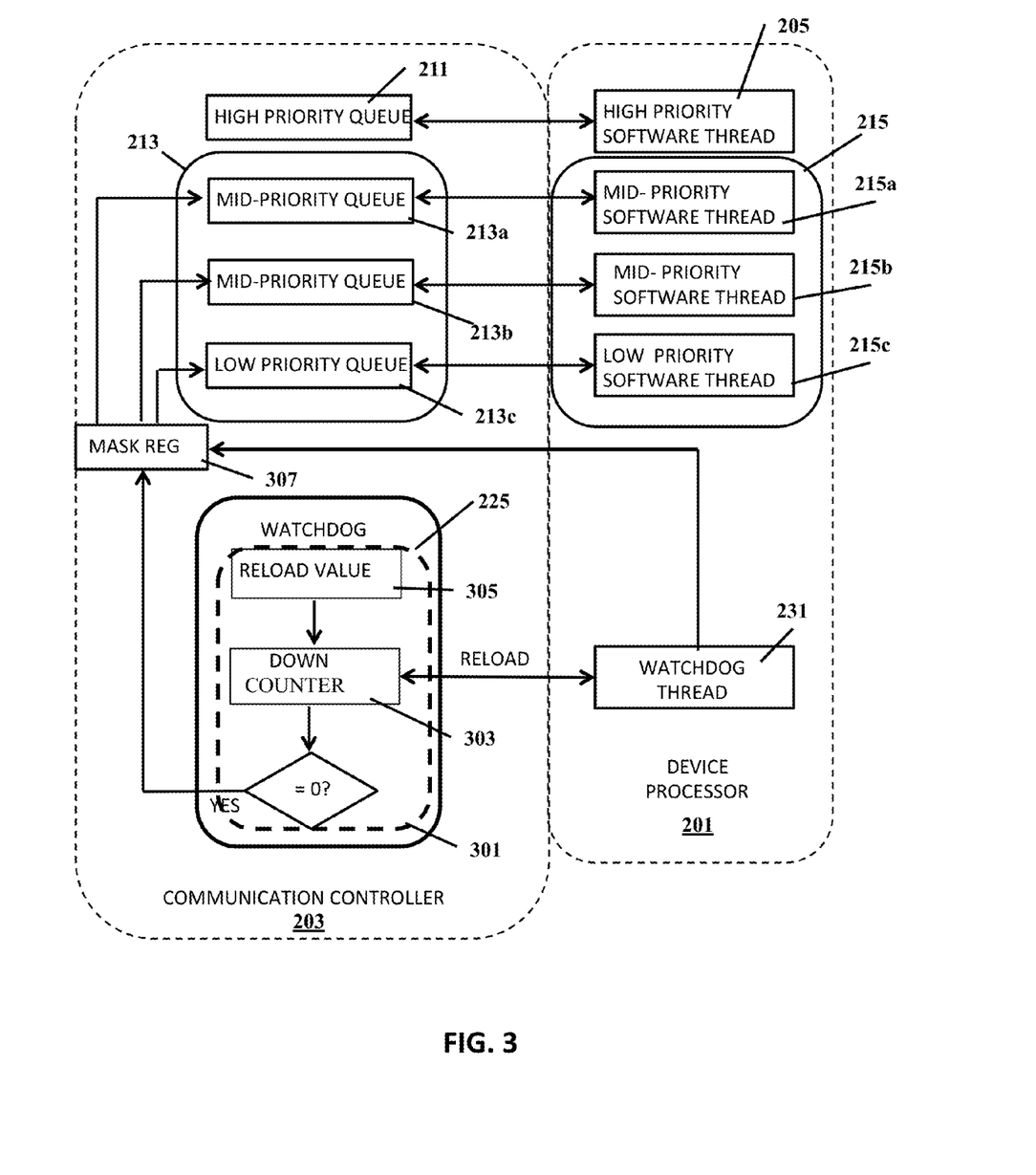
FIG. 3 is a more detailed block diagram of a portion of the field device of FIG. 2.

Communication controller 203 provides a network interface watchdog 225 shown in FIG. 3. Network interface watchdog 225 provides an approach for device processor 201 to communicate its ability to accept data packets received at I/O controller 209.

Turning now to FIG. 3, network interface watchdog 225 comprises a hardware timer 301. Hardware timer 301 provides a predetermined time delay. Timer 301, in this embodiment, comprises a resettable down counter 303. Counter 303 is set and reset to a predetermined value provided by register 305 that is preprogrammed with a count corresponding to the predetermined delay.

In this embodiment, there is one high priority queue 211 and a plurality of lower priority queues 213a, 213b, 213c.

Device processor 201 comprises a high priority software application or thread 205 exchanging high priority data with high priority data queue 211 over high priority data path 202, and a plurality of lower priority threads 215a, 215b, 215c, each exchanging low priority data with corresponding ones of lower priority queues 213a, 213b, 213c via corresponding lower priority data paths that are not shown. Device processor 201 also comprises watchdog thread 231.

A mask register 307 is provided to allow the device processor 201 to indicate which data path channels are to be affected by watchdog timer 225 where there is more than one non-high priority data path.

When network interface watchdog 225 is operating, register 305 initially loads its start value into counter 303. If counter 303 is non-zero, i.e., it has not counted down from the start value loaded from register 305, all incoming data packets from bus 105 to communication controller 203 are made available to device processor 201 and interrupts are generated as usual.

Counter 303 is reset to the start value by watchdog thread 231.

If counter 303 reaches zero, those channels that are indicated for timer control by mask register 307 are restricted as to a number of packets that are retained in the corresponding ones of lower priority queues 213a, 213b, 213c, the status indicated to device processor 201 is of empty data paths or channels, and/or no interrupts are generated for those data paths or channels. Incoming data packets to the restricted data paths that exceed the number of data packets storable in the corresponding queue are dropped.

When watchdog thread 231 generates a trigger, counter 303 is reset to the start value and the counter 303 is no longer at zero. Normal processing of data packets resumes. Data paths having packets in their respective queues indicate that status and interrupts are generated as usual.

Providing a network interface watchdog 225 allows the trigger function to be allocated to a low priority thread 231. When network interface watchdog 225 is triggered regularly by device processor 201 it is an indication to communication controller 203 that device processor 201 is able to handle the data load. If network interface watchdog 225 is not triggered regularly, device processor 201 is overloaded and the described judicious disposal of packets is performed. This allows device processor 201 to survive traffic overload with a controlled approach to packet disposal.

In other embodiments, network interface watchdog 225 may be extended to both high priority data processing and low priority data processing.

For many protocols the high priority data packet path or channel is very simple. The data packet path may comprise the above-described evaluation/quality check of incoming data packets and insertion of simple counters and/or checksums for outgoing data packets. For such embodiments hardware implementing the data packet processing path may be connected directly to the functional portion of the device 103 hardware, thereby eliminating interaction with device processor 201 and its software altogether. More specifically the high priority data packet path 202 may be connected directly to the physical I/O of device 103. Software processing is still necessary to establish the connection with PLC 101, manage alarms and error conditions, etc. This approach eliminates the jitter and latency of device processor 201, along with simplifying the software associated with device processor 201.

Functions that are commonly associated with high traffic situations on the low priority packet data path or channel can be managed directly in the priority channel hardware. For example, a common network stress is what is known as an ARP storm. ARP requests are typically sent over an Ethernet network 100 using a broadcast address and must be evaluated by all devices 105 on network 100.

A typical prior approach to this is to simply limit the number of broadcast packets that can be transmitted by an Ethernet switch in a period of time, with all others being discarded. This is problematic because some of the ARP packets are critical to the proper operation of the network.

Communication controller 203 is configured to manage high traffic storms such as the above-described ARP storm in accordance with a predetermined management arrangement.

One such management arrangement for managing data packets that are broadcast data packets is for communication controller 203 to identify broadcast data packets and to limit the broadcast data packet traffic provided to device processor 201.

In another management arrangement communication controller 203 evaluates each broadcast data packet to determine if it is of a predetermined type such as an ARP packet and is addressed to device 103 before forwarding the broadcast data packet to device processor 201.

In further management arrangements, communication controller 203 manages other data packets that are broadcast data packets of a predetermined type such as ARP packets by determining that a broadcast data packet is of a predetermined type and is addressed to the device, generating a response to PLC 101 and not forwarding the broadcast data packet to device 103.

In other various embodiments, communication controller 203 manages all low priority data packets by limiting data packet traffic to device processor 201 by utilizing one of the foregoing management approaches.

Providing data packet management substantially reduces worst-case traffic that must be managed by a device 103. In conjunction with the watchdog approach described above device performance in network overload situations is substantially improved.

Figure 4:
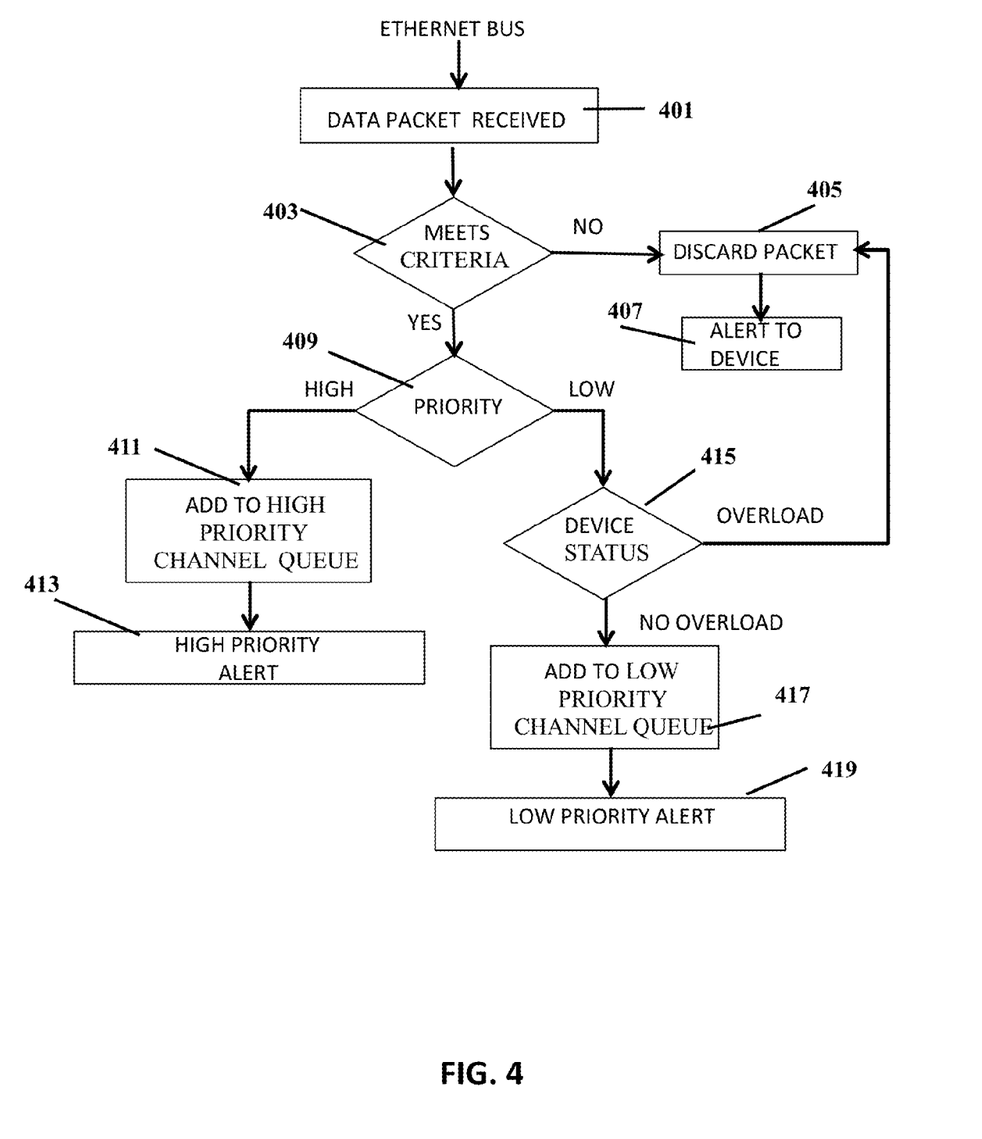
FIG. 4 illustrates method steps.

FIG. 4 illustrates the methodology of communication controller 203 in processing incoming data received on bus 105.

At step 401, communication controller 203 receives a data packet at bus 105.

At step 403, communication controller 203 evaluates the quality of the data taking into consideration predetermined factors. The predetermined factors may include: the timeliness of the received data; protocol-specific fields (serial counters, checksums, etc.); the data source; destination addressing; and various other parameters depending on the protocol At step 405, communication controller 203 rejects any data that fails the quality check by discarding the data packet and an alert is provided to device processor 201 at step 407.

At step 409, data packets that meet the quality check at step 403 are identified by priority. Communication controller 203 determines whether data that passes the quality check is high priority or low priority. Although the embodiment shows that the quality check step 403 takes place prior to step 409, in other embodiments, the quality check may be performed after prioritization. In such embodiments, the quality check step 203 may be performed only on high priority data.

At step 411, high priority data is provided to high priority queue 211 and at step 413, an alert is provided to device processor 201.

At step 415, the overload status of device 103 is determined. If device 103 is overloaded, low priority data packets are discarded at step 405. If device 103 is not overloaded, low priority data is provided to low priority queue 213 at step 417 and at step 419 an alert it provided to device processor 201.

In the embodiments shown in FIGS. 2 and 3, data packet traffic overload conditions are managed by receiving indications from device processor 201 indicative of processing status of the device processor 201 and restricting data packet traffic by type based on the indications. If device processor 201 is subject to an overload, the indication is an overload indication.

The managing of data packet traffic overload conditions is provided by communication controller 203 monitoring at least one of data packet traffic and data packet types, and restricting data packet traffic or data packet types when the monitoring indicates that the data packet traffic or the data packet types exceed a predetermined level.

The monitoring of data packet traffic is provided on at least one of the high priority communication data path 202 and each additional data path, e.g., low priority data path 204.

The monitoring may comprise determining if data packet traffic monitored on at least one of the high priority data path 202 and each additional data path, e.g., low priority data path 204, exceeds a predetermined level.

In one embodiment, communication controller 203 provides restricting data packet traffic on a data path when the data packet traffic exceeds the predetermined level.

The embodiment may comprise determining if data packet traffic message types monitored on at least one of high priority data path 202 and each additional data path, e.g., low priority data path 204, exceeds a predetermined level.

The embodiment may comprise managing data packet traffic overload conditions by monitoring at least one of data packet traffic and data packet types, and restricting the monitored data packet traffic or data packet types when the monitoring indicates that the data packet traffic or the data packet types exceed a predetermined level.

In yet another embodiment the method may comprise managing data packet traffic overload conditions by receiving feedback indications from device processor 201 indicative of data packet processing status of device processor 201; and restricting data packet traffic by type based on the feedback indications.

The embodiment may comprise providing a network interface watchdog 225 responsive to device processor 201 to restrict or not restrict data packets.

The embodiment may further comprise operating the network interface watchdog 225 such that communication controller 203 restricts incoming data packets for one or more preselected channels in response to feedback indications from device processor 201.

In various embodiments, the at least one additional data path is one of a plurality of additional data paths for the other data packets.

The various embodiments may further comprise managing device processor 201 overload conditions for a predetermined data path of the plurality of additional data paths, receiving indications from device processor 201 indicative of processing status of packet data received for the predetermined data path, and selectively restricting data packet traffic for the predetermined data path based on the indications.

The various embodiments may comprise providing a network interface watchdog apparatus 225 responsive to the indications to control acceptance of received data packets by the I/O controller 209, operating network interface watchdog 225 such that the I/O controller 209 drops incoming data packets for the predetermined data path when device processor 201 provides corresponding indications.

In further embodiments, the method comprises providing network interface watchdog 225 with a mask register 305 that device processor 201 utilizes to indicate which data path or data paths of the plurality of additional data paths are subject to overload management.

In the further embodiments, the method may comprise providing network interface watchdog 225 apparatus with a timer 301 having a programmable delay, operating timer 301 such that when timer 301 is in a first predetermined state, data packets are forwarded to the additional data path or paths subject to overload management, and operating timer 301 such that when timer 301 is in a second predetermined state, data packets are restricted for the additional data path or paths subject to overload management.

The method may comprise controlling operation of timer 301 with triggers received from device processor 201. Device processor 201 provides the triggers on a regular basis when device processor 201 is able to timely process data packets, and device processor 201 does not provide the triggers on a regular basis when device processor 201 reaches a data packet processing overload condition.

In other various embodiments, the method comprises managing other data packets that are broadcast data packets by limiting broadcast data packet traffic to device processor 201.

In other various embodiments, the method comprises managing other data packets that are broadcast data packets by evaluating each broadcast data packet to determine if it is of a predetermined type and is addressed to device 103 before forwarding the broadcast data packet to device processor 201.

In other various embodiments, the method comprises managing the other data packets that are broadcast data packets by determining that a broadcast data packet is of a predetermined type and is addressed to device 103, generating a response and not forwarding the broadcast data packet to device 103.

In other various embodiments, the method comprises managing the other data packets by limiting data packet traffic to device processor 201.

The method may comprises managing the other data packets by evaluating each data packet to determine if it is of a predetermined type and is addressed to device 103 before forwarding said data packet to device processor 201.

In other various embodiments, the method comprises managing the other data packets by determining that a data packet is of a predetermined type and is addressed to device 103, generating a response and not forwarding the data packet to device processor 201.

The invention has been described in terms of various embodiments. It will be apparent to those skilled in the art that various changes or modifications may be made to the embodiments described without departing from the scope of the invention. It is not intended that the invention be limited to the embodiments shown and described, but that the invention be limited only by the scope of the claims appended hereto.

The invention claimed is:

1. Communication controller apparatus coupling a device to a data bus that is coupled to a controller, said device comprising a device processor, said communication controller apparatus comprising:
  at least one input/output controller coupled to said bus to receive a plurality of types of data packets via said data bus, said types comprising at least one type of data packets having a high priority determined by timing criticality;
  said input/output controller operable to process data packets received via said bus before providing any of said received data packets to said device processor;
  said input/output controller is further operable to evaluate received data packets in accordance with predetermined criteria and to reject predetermined ones of said received data packets that fail to meet said predetermined criteria;
  said input/output is controller is operable to identify said received data packets as high priority data packets and low priority data packets;
  a high priority data path to said device for said high priority data packets, said high priority data path comprising a high priority data packet queue; and
  a low priority data path to said device for said low priority data packets, said low priority data path comprising a low priority data packet queue;
  monitor apparatus to monitor data packet traffic on at least one of said high priority data path and said low priority data path;
  said monitor apparatus monitors data packet traffic message types on at least one of said high priority data path and said low priority data path; and
  said monitor apparatus determines if data packet traffic message types monitored on at least one of said high priority data path and said low priority data path exceeds a message type predetermined level.

2. Communication controller apparatus in accordance with claim 1, wherein:
  said device processor comprises executable software arranged to minimize latency in processing said high priority data packets regardless of processing said low priority data packets.

3. Communication controller apparatus in accordance with claim 1, comprising:
  said communication controller apparatus generates an alert to said device in when received data packets are rejected.

4. Communication controller apparatus in accordance with claim 1, wherein:
  said predetermined criteria is determined by the communication protocol utilized on said data bus.

5. Communication controller apparatus in accordance with claim 4, wherein:
  said predetermined criteria is selected from timeliness, protocol specific fields, data source, destination addressing, and protocol dependent parameters.

6. Communication controller apparatus accordance with claim 1, wherein.:
  said bus comprises an Ethernet bus.

7. Communication controller apparatus in accordance with claim 1, comprising:
  said communication controller apparatus is operable to process said high priority received data packets and said low priority received data packets such that processing said high priority data packets is not interrupted for said received low priority data packets.

8. Communication controller apparatus in accordance with claim 7, comprising:
  processing said data packets such that alerts associated with said low priority data packets will not interrupt processing of said high priority data packets.

9. Communication controller apparatus in accordance with claim 1, comprising:
  a high priority output data path from said device processor to said bus via said input/output controller for high priority output data packets;
  a low priority output data path from said device processor to said bus via said input output controller for low priority output data packets; and
  one of said communication controller and said device processor operable to interrupt transfer of said low priority output data packets to said bus whenever a said high priority output data packet become available from said device processor.

10. Communication controller apparatus in accordance with claim 9, comprising:
  a communication controller processor operable to manage data packet traffic overload conditions in response to receiving an indication from said device processor indicative of a processing status of said device processor to restrict data packet traffic by type.

11. Communication controller apparatus in accordance with claim 9, comprising:
  a communication controller processor operable to manage data packet traffic overload conditions in response to receiving an indication from said device processor indicative of a processing status of said device processor to restrict data packet traffic or data packet types when said data packet traffic or said data packet types exceed a predetermined level.

12. Communication controller apparatus in accordance with claim 1, comprising:
  said monitor apparatus determines if data packet traffic monitored on at least one of said high priority data path and each said low priority data path exceeds a traffic predetermined level.

13. Communication controller apparatus in accordance with claim 12, comprising:
  said monitor apparatus restricts data packet traffic on said low priority data path when said data packet traffic on said low priority data path exceeds said traffic predetermined level.

14. Communication controller apparatus coupling a device to a data bus that is coupled to a controller, said device comprising a device processor, said communication controller apparatus comprising:
  at least one input/output controller coupled to said bus to receive a plurality of types of data packets via said data bus, said types comprising at least one type of data packets having a high priority determined by timing criticality;
  said input/output controller operable to process data packets received via said bus before providing any of said received data packets to said device processor;
  said input/output controller is further operable to evaluate received data packets in accordance with predetermined criteria and to reject predetermined ones of said received data packets that fail to meet said predetermined criteria;
  said input/output is controller is operable to identify said received data packets as high priority data packets and low priority data packets;
  a high priority data path to said device for said high priority data packets, said high priority data path comprising a high priority data packet queue; and
  a low priority data path to said device for said low priority data packets, said low priority data path comprising a low priority data packet queue;
  monitor apparatus to monitor data packet traffic on at least one of said high priority data path and said low priority data path;
  said monitor apparatus monitors data packet traffic message types on at least one of said high priority data path and said low priority data path; and
  said monitor apparatus restricts data packet traffic message types on one of said high priority data path and said low priority data path when said data packet traffic types exceeds said traffic predetermined level.

15. Communication controller apparatus in accordance with claim 1, comprising:
  data packet traffic management apparatus to monitor at least one of data packet traffic and data packet types, and to restrict said data packet traffic or data packet traffic of said data packet types when said data packet traffic or said data packet traffic of said data packet types exceed a predetermined level.

16. Communication controller apparatus in accordance with claim 15, comprising:
  said data packet traffic management apparatus monitors data packet traffic on at least one of said high priority data path and each said low priority data path.

17. Communication controller apparatus in accordance with claim 16, comprising:
  said data packet traffic management apparatus determines if said monitored data packet traffic exceeds said data packet traffic predetermined level.

18. Communication controller apparatus in accordance with claim 17, comprising:
  said data packet traffic management apparatus restricts said monitored data packet traffic when said monitored data packet traffic exceeds said data packet traffic predetermined level.

19. Communication controller apparatus in accordance with claim 15, comprising:
  said data packet traffic management apparatus monitors said data packet traffic message types.

20. Communication controller apparatus in accordance with claim 19, comprising:
  said data packet traffic management apparatus determines if data packet traffic message types monitored exceed a message type predetermined level.

21. Communication controller apparatus in accordance with claim 20, comprising:
  said data packet traffic management apparatus restricts data packet traffic message types when said data packet traffic exceeds said data packet traffic predetermined level.

22. Communication controller apparatus in accordance with claim 1, comprising:
  said data packet traffic management apparatus coupled to said device processor to receive indications from said device processor indicative of processing status of said device processor and to restrict data packet traffic by type based on said indications.

23. Communication controller apparatus in accordance with claim 22, comprising:
  network watchdog apparatus responsive to said device processor to control said input/output apparatus to restrict or not restrict processing of data packets.

24. Communication controller apparatus in accordance with claim 23, comprising:
  said network watchdog apparatus operates to restrict incoming data packets for one or more preselected data paths in response to said device processor.

25. Communication controller apparatus in accordance with claim 24, comprising:
  a plurality of lower priority data paths, said lower priority data paths having a priority lower than said high priority data path.

26. Communication controller apparatus in accordance with claim 25, comprising:
  said network watchdog apparatus operates to manage processor overload conditions for predetermined one data paths of said lower priority data paths.

27. Communication controller apparatus in accordance with claim 26, wherein:
  said network watchdog apparatus receives indications from said device processor indicative of processing status of packet data received for said predetermined one data paths and is operable to cause said input/output apparatus to selectively restrict data packet traffic for said predetermined one data paths.

28. Communication controller apparatus in accordance with claim 27, comprising:
  said network watchdog apparatus is operable to selectively control acceptance of received data packets by said input/output apparatus.

29. Communication controller apparatus in accordance with claim 28, comprising:
  said network watchdog is operable to cause said input/output apparatus to drop predetermined ones of incoming data.

30. Communication controller apparatus in accordance with claim 29, comprising:
  said network watchdog apparatus comprises a mask register, said mask register is responsive to said device processor to indicate which data paths of said plurality of lower priority data paths are subject to overload management.

31. Communication controller apparatus in accordance with claim 30, comprising:

said network watchdog apparatus comprises a timer, said timer having a predetermined delay, said timer being in a first state or a second state, when said timer is in said first state, data packets are forwarded from said input/output apparatus to said plurality of lower priority data paths subject to overload management; and when said timer is in said second state, said data packets are restricted for said plurality of lower priority data paths subject to overload management.

32. Communication controller apparatus in accordance with claim 31, comprising:
   said timer is controlled by signals from said device processor.

33. Communication controller apparatus in accordance with claim 32, wherein:
   said device processor provides said reset signals to said timer on a regular basis when said device processor is able to timely process data packets; and
   said device processor does not provide said reset signals when said device processor reaches a data packet processing overload condition.

34. Communication controller apparatus in accordance with claim 1, comprising:
   said input/output controller operates to limit providing to said device said lower priority data packets that are broadcast data packets.

35. Communication controller apparatus in accordance with claim 1, comprising:
   said input/output controller manages said lower priority data packets that are broadcast data packets by: evaluating each broadcast data packet to determine if it is of a predetermined type and is addressed to said device before forwarding said broadcast data packet to said device.

36. Communication controller apparatus in accordance with claim 1, comprising:
   said input/output controller is operable to manage said lower priority data packets that are broadcast data packets by: determining that a broadcast data packet is of a predetermined type and is addressed to said device, generating a response and not forwarding said broadcast data packet to said device.

37. Communication controller apparatus in accordance with claim 1, comprising:
   said input/output controller is operable to limit low priority data packet traffic presented to said device.

38. Communication controller apparatus in accordance with claim 1, comprising:
   said input/output controller is operable to evaluate each data packet to determine if it is of a predetermined type and is addressed to said device before forwarding said data packet to said device.

39. Communication controller apparatus in accordance with claim 1, comprising:
   said input/output controller is operable to determine if a data packet received over said bus is of a predetermined type and is addressed to said device, automatically generating a response and not forwarding said data packet or said predetermined type to said device.

40. Communication controller apparatus in accordance with claim 1, comprising:
   a first programmable unit operable to provide a first plurality of threads of operation with said bus; and
   a second programmable unit operable to provide a second plurality of threads of operation with said device processor.

41. Communication controller apparatus in accordance with claim 1, comprising:
   apparatus to provide alerts to said device when said high priority data is available for said device; and
   apparatus to provide alerts to said device when said low priority data is available for said device.

* * * * *